(12) United States Patent
Kurosawa et al.

(10) Patent No.: US 7,733,389 B2
(45) Date of Patent: Jun. 8, 2010

(54) IMAGE CAPTURING APPARATUS HAVING ELECTRONIC ZOOM FUNCTION

(75) Inventors: Kazuyuki Kurosawa, Iruma (JP); Jin Nakayama, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 533 days.

(21) Appl. No.: 11/787,798

(22) Filed: Apr. 18, 2007

(65) Prior Publication Data

US 2007/0257996 A1 Nov. 8, 2007

(30) Foreign Application Priority Data

Apr. 21, 2006 (JP) .............................. 2006-118507

(51) Int. Cl.
*H04N 5/262* (2006.01)
(52) U.S. Cl. .................................. 348/240.2
(58) Field of Classification Search ............... 348/240.2
See application file for complete search history.

(56) References Cited

U.S. PATENT DOCUMENTS 5,838,371 A 11/1998 Hirose et al.
6,801,250 B1 * 10/2004 Miyashita ................. 348/220.1

FOREIGN PATENT DOCUMENTS

| | | | |
|---|---|---|---|
| EP | 1 083 742 A2 | 3/2001 | |
| JP | 2004-72278 A | 3/2004 | |
| JP | 2004-096611 | * | 3/2004 |
| JP | 2004-96611 A | 3/2004 | |
| JP | 2004-172845 A | 6/2004 | |
| JP | 2005-191867 A | 7/2005 | |

OTHER PUBLICATIONS

English translation of JP-0911 Mar. 2004 Japan Yamamoto.*
Notification Concerning Transmittal of International Search Report and Written Opinion of the International Searching Authority, Dated Aug. 31, 2007, for PCT/JP2007/058998, 13 sheets.

* cited by examiner

*Primary Examiner*—James M Hannett
(74) *Attorney, Agent, or Firm*—Frishauf, Holtz, Goodman & Chick, P.C.

(57) ABSTRACT

An image capturing apparatus includes an image capturing element which outputs a captured image signal including pixels, a magnification setting unit which sets an electronic zoom magnification, a mode setting unit which sets one of reading modes which vary in a number of the pixels included in the captured image signal according to the electronic zoom magnification, an electronic zoom unit which performs an electronic zoom process on the captured image signal based on the electronic zoom magnification, and an image quality adjuster which performs an image quality adjustment on the captured image signal based on the electronic zoom magnification.

19 Claims, 12 Drawing Sheets

100

| ZOOM MAGNIFICATION 100a | READING MODE 100b | EXTRACTION SIZE 100c | SCALING FACTOR 100d | IMAGE QUALITY ADJUSTMENT 100e |
|---|---|---|---|---|
| 1× | 3×3 PIXEL ADDITION | ENTIRE AREA | 66.67% | NO |
| ↑↓ | | ↑↓ | ↑↓ | SHARPENING (MINIMUM DEGREE) |
| | | | | ↑↓ |
| 1.5× | | 640×480 | 100% | SHARPENING (MAXIMUM DEGREE) |
| 1.5× | 2×2 PIXEL ADDITION | 960×720 | 66.67% | SOFTENING (MAXIMUM DEGREE) |
| ↑↓ | | ↑↓ | ↑↓ | ↑↓ |
| | | | | SOFTENING (MINIMUM DEGREE) |
| | | | | NO |
| | | | | SHARPENING (MINIMUM DEGREE) |
| | | | | ↑↓ |
| 2.25× | | 640×480 | 100% | SHARPENING (MAXIMUM DEGREE) |
| 2.25× | ENTIRE PIXEL | 1,260×960 | 50% | SOFTENING (MAXIMUM DEGREE) |
| ↑↓ | | ↑↓ | ↑↓ | ↑↓ |
| | | | | SOFTENING (MINIMUM DEGREE) |
| | | | | NO |
| 4.5× | | 640×480 | 100% | |

IMAGE CAPTURING APPARATUS HAVING ELECTRONIC ZOOM FUNCTION

CROSS-REFERENCE TO RELATED APPLICATIONS

This application is based upon and claims the benefit of priority from prior Japanese Patent Application No. 2006-118507, filed Apr. 21, 2006, the entire contents of which are incorporated herein by reference.

BACKGROUND OF THE INVENTION

1. Field of the Invention

The present invention relates to an image capturing apparatus and an electronic zoom method which can be applied to a digital camera having an electronic zoom function.

2. Description of the Related Art

Conventionally, an image capturing apparatus having an electronic zoom function such as a digital camera is provided with the following technique for acquiring a partial image of an area corresponding to a zoom magnification. In order to read out an image signal from an image sensor, such as a charge coupled device (CCD), a pixel-thinning mode and pixel-addition modes are prepared as a reading mode in addition to a normal reading mode. In the pixel-addition modes, the number of pixels utilized for pixel-addition is varied. The image signal including the number of pixels (pixel size) corresponding to the zoom magnification is acquired by switching the reading modes depending on the electronic zoom magnification. A partial image of a preset area is extracted from an image based on the acquired image signal. Then the extracted image is scaled. The technique for acquiring a partial image of an area corresponding to the setting of the zoom magnification is described in, for example, Jpn. Pat. Appln. KOKAI Publication No. 2004-172845, Jpn. Pat. Appln. KOKAI Publication No. 2005-191867, Jpn. Pat. Appln. KOKAI Publication No. 2004-72278, Jpn. Pat. Appln. KOKAI Publication No. 2004-96611.

However, at the time of switching the reading modes, the image quality changes discontinuously. The change in the image quality is caused by factors such as a variation in the number of pixels utilized for the pixel-addition, a variation in the pixel-thinning rate or a variation in the enlargement or reduction ratio. Therefore, the image quality after the extraction and the scaling processes is greatly changed at the zoom magnification where the reading mode is switched.

BRIEF SUMMARY OF THE INVENTION

An object of the present invention is to provide an image capturing apparatus and an electronic zoom method for improving electronic zoom quality by eliminating a large variation in image quality while the zoom magnification is being changed.

According to an embodiment of the present invention, an image capturing apparatus comprises:

an image capturing element configured to output a captured image signal including pixels;

a magnification setting unit configured to set an electronic zoom magnification;

a mode setting unit configured to set one of reading modes which vary in number of the pixels included in the captured image signal according to the electronic zoom magnification;

an electronic zoom unit configured to perform an electronic zoom process on the captured image signal based on the electronic zoom magnification; and an image quality adjuster configured to perform an image quality adjustment on the captured image signal based on the electronic zoom magnification.

According to another embodiment of the present invention, an electronic zoom method which is used for an image capturing apparatus comprising an image capturing element which outputs a captured image signal including pixels, the method comprises:

setting an electronic zoom magnification;

setting one of reading modes which vary in number of the pixels included in the captured image signal according to the electronic zoom magnification;

performing an electronic zoom process on the captured image signal based on the electronic zoom magnification; and performing an image quality adjustment on the captured image signal based on the electronic zoom magnification while one of the reading modes is set.

According to another embodiment of the present invention, a computer program product for use with an image capturing apparatus including an image capturing element which outputs a captured image signal including pixels, the computer program product being stored in a computer usable medium including computer readable program means, the computer program product comprises:

first computer readable program means for setting an electronic zoom magnification;

second computer readable program means for setting one of reading modes which vary in number of the pixels included in the captured image signal according to the electronic zoom magnification;

third computer readable program means for performing an electronic zoom process on the captured image signal based on the electronic zoom magnification; and fourth computer readable program means for performing an image quality adjustment on the captured image signal based on the electronic zoom magnification while one of the reading modes is set.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 2 is a conceptual diagram showing a setting table used for an electronic zoom control process in the moving image capturing mode;

FIG. 5A is a conceptual diagram partly showing Bayer data formed by image signals read out in the 2×2 pixel-addition mode;

FIG. 5B is a conceptual diagram partly showing Bayer data formed by image signals read out in the 3×3 pixel-addition mode;

DETAILED DESCRIPTION OF THE INVENTION

Figure 1:
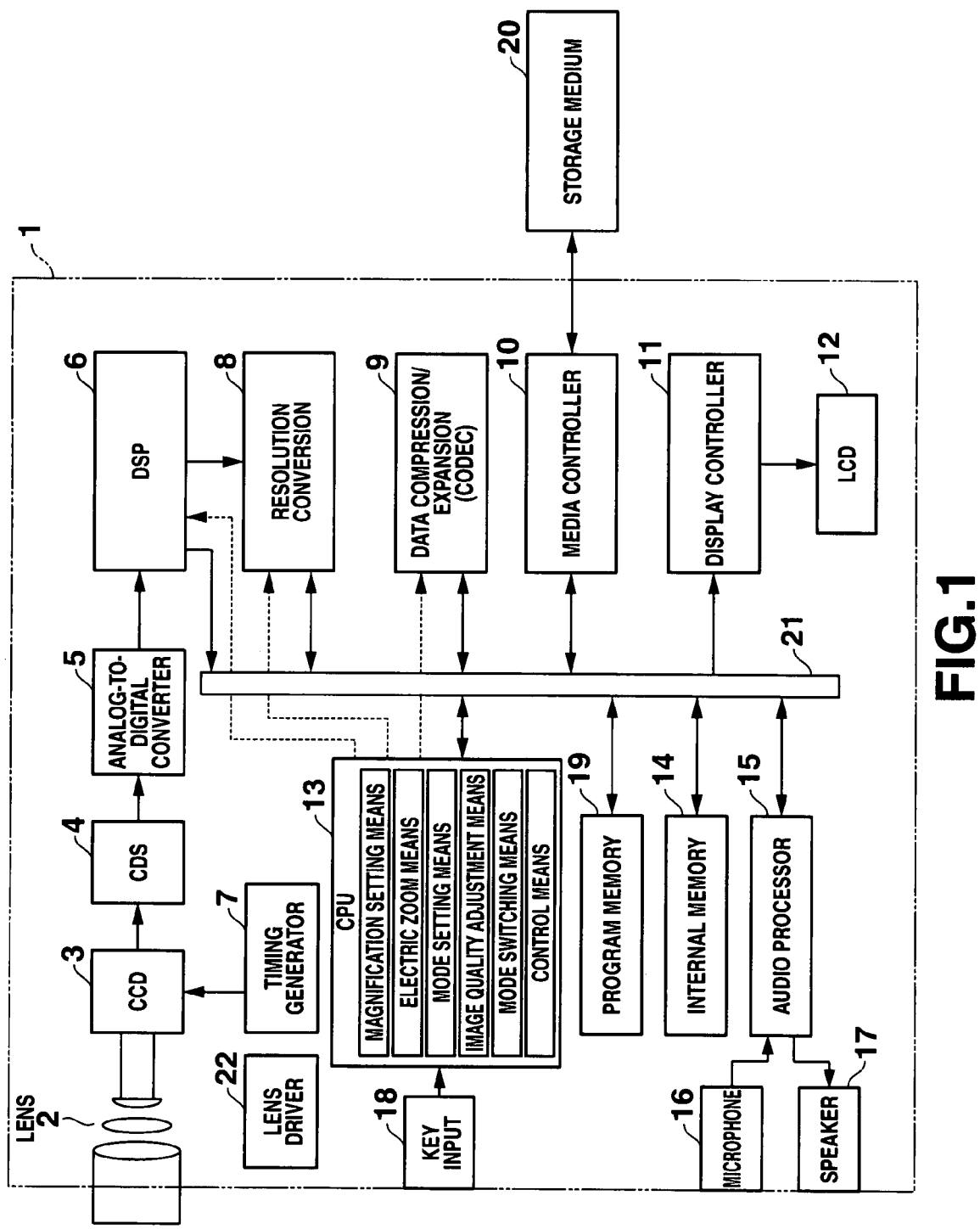
FIG. 1 is a block diagram showing an electric configuration of a digital camera according to an embodiment of the present invention.

An embodiment of an image capturing apparatus according to the present invention will now be described with reference to the accompanying drawings. FIG. 1 is a schematic block diagram of a digital camera according to the present embodiment. The digital camera has a still image capturing function and a moving image capturing function. The following is a configuration of the digital camera.

The digital camera includes a camera body 1, and a storage medium 20. The storage medium 20 is a removable memory and is connected to the camera body 1. The camera body 1 includes an optical system 2 and a CCD image sensor 3. The optical system 2 is equipped with a zoom lens and a focus lens. The CCD image sensor 3 serves as an image capturing element. A timing generator 7 generates horizontal and vertical drive signals under control of a CPU 13. The CCD image sensor 3 is driven in response to the generated drive signals, performs photoelectric conversion on an optical image of an object, and outputs the converted image signal. In the present embodiment, the number of effective pixels of the CCD image sensor 3 is set to 2,880×2,160 (horizontal×vertical). Further, as the drive mode of the CCD image sensor 3, i.e., as the reading mode of an image signal from the CCD image sensor 3, three types of reading modes are prepared such as an "entire pixel mode", a "2×2 pixel-addition mode" and a "3×3 pixel-addition mode" (described later).

A correlated double sampling (CDS) circuit 4 executes a correlated double sampling process on the image signal output from the CCD image sensor 3. An analog-to-digital conversion circuit 5 converts the image data processed by the CDS circuit 4 into a digital image signal. The digital image signal is transferred to a digital signal processor (DSP) 6. The DSP 6 performs image processing such as a pedestal clamp process on the digital image signal. A luminance/color-difference matrix circuit in the DSP 6 converts the digital image signal into a luminance (Y) signal and color-difference (UV) signal by the YUV conversion.

Moreover, the DSP 6 performs a variety of image processes such as an auto white balance process under control of the CPU 13. Particularly, when the electronic zoom function is running, the DSP 6 serves as an image quality adjuster according to the present embodiment and performs a sharpening process (first image quality adjustment) or a softening process (second image quality adjustment) as required. The sharpening process is a process for emphasizing a part of an image, such as an edge or contour line, having a large difference (gradation difference) in color or brightness with respect to adjacent pixels. The softening process is a process for decreasing the contrast of the image by reducing a variation (gradation difference) in color and brightness on a part of the image having a large difference. Both of the sharpening and softening processes are performed in a unit of pixels containing a preset number of pixels. The sharpening or softening process is performed by increasing or decreasing the luminance value of a target pixel in the unit of pixels depending on the difference of the luminance values between the target pixel and the adjacent pixels.

Every frame of the YUV data output from the DSP 6 is transferred via a data bus 21 and sequentially stored in an internal memory 14 such as a synchronous dynamic random access memory (SDRAM). The frame of the YUV data stored in the internal memory 14 may be read out by the CPU 13. At the time of reading out the YUV data, an extraction process is performed if necessary by extracting merely data corresponding to a preset image area from the YUV data.

The YUV data read out from the internal memory 14 is scaled as required in the scaling circuit 8 according to a preset image size. A display controller 11 converts the scaled YUV data into a video signal. A liquid crystal display (LCD) 12 displays the video signal as a through image.

The scaling process of enlarging or reducing image size in the scaling circuit 8 is performed based on a preset scaling algorithm, for example, a geometrical interpolation method such as zero-order interpolation, first-order interpolation, third-order interpolation or a projective method.

In a still image capturing mode, based on the JPEG format or the like, a data compression/expansion block 9 compresses and codes the frame of the YUV data read out from the internal memory 14. The compressed YUV data is converted into the file format in the internal memory 14. The data in the file format is stored in the storage medium 20 as still image data (still image file) through a media controller 10. In a moving image capturing mode, the frames of the YUV data are sequentially supplied to the data compression/expansion block 9 to be compressed and coded by a codec of a preset moving image recording format (for example, Motion-JPEG or MPEG). Finally, the frames of the YUV data are transferred to the storage medium 20 to be stored as a moving image file through the media controller 10.

In a playback mode, the data compression/expansion block 9 expands data of a still image or a moving image read out from the storage medium 20. The expanded data is developed in a work area for image data in the internal memory 14 as still image data or moving image frame data.

A microphone 16 is housed in the camera body 1. At the time of capturing a moving image with an audio input, the microphone 16 picks up the audio input. An audio process block 15 converts the audio input into a digital signal. The digitalized audio signal is compressed and sent to the internal memory 14 as audio data. The audio data sent to the internal memory 14 is stored in the storage medium 20 together with the moving image file. Moreover, at the time of playing the moving image, the audio process block 15 decodes the audio data sent from the internal memory 14 and converts the decoded audio data into an analog audio signal. The analog audio signal is output from an internal speaker 17 housed in the camera body 1.

A key input block 18 includes operation keys such as a power key, a mode switching key, a menu key, a shutter key and a zoom key. The mode switching key is used to switch modes among the still image capturing mode, moving image capturing mode and playback mode. The key input block 18 outputs a key input signal to the CPU 13 corresponding to a key operation by a user. The shutter key also functions as a recording start/end button when capturing the moving image.

A lens drive signal is generated by a lens driver 22 according to an instruction from the CPU 13. The focus lens and the zoom lens in the optical system 2 are driven according to the generated drive signal. The focus lens is driven to a focus position based on an automatic focus (AF) control by the CPU 13. The zoom lens is driven to a zoom position corresponding to the operation of the zoom key by the user.

The above blocks are controlled by the CPU 13. A program and a variety of data required for the CPU 13 to control the above blocks are stored in a program memory 19. The program memory 19 is a rewritable nonvolatile memory such as an electrically erasable programmable read only memory (EEPROM) or a flash memory. The program memory 19 stores another setting data relating to a system or functions of the digital camera set or updated by the user. The CPU 13 controls the above blocks based on the program and key input signal.

Moreover, the program memory 19 stores data configuring a setting table 100 as shown in FIG. 2. The setting table 100 is utilized for an electronic zoom control process. A plurality of setting tables 100 are prepared for respective desired image sizes. Namely, the setting tables 100 are prepared respectively for recordable sizes in the moving image capturing mode. Moreover, the setting tables 100 are prepared respectively for image sizes which the LCD 12 can display as the through image in the moving image capturing mode or in a standby state of the still image capturing mode.

Each setting table 100 includes an electronic zoom magnification (zoom magnification realized without an optical zoom) 100a, and setting items corresponding to the zoom magnifications such as a reading mode 100b, an extraction size 100c, a scaling factor 100d and image quality adjustment 100e.

When one of the desired image sizes is selected, a setting table 100 is read out in accordance with the selected desired image size. When the user sets the electronic zoom magnification, the CPU 13 detects the setting data of the items 100b to 100e in accordance with the set electronic zoom magnification 100a from the read out setting table 100. The CPU 13 performs the electronic zoom control process based on the detected setting data.

When the setting data of the reading mode (drive mode of the CCD image sensor 3) 100b is detected and set corresponding to the electronic zoom magnification 100a, the CCD image sensor 3 is driven in the set reading mode 100b and an image signal (Bayer data) is read out from the CCD image sensor 3. A partial image of an area corresponding to the setting data of the extraction size 100c is extracted from the image based on the read out image signal. The extracted image is scaled depending on the setting data of the scaling factor (enlargement ratio or reduction ratio) 100d to provide an image having the required number of pixels. The image quality adjustment process is performed on the basis of the setting data of the image quality adjustment 100e. The extraction size is expressed by the numbers of pixels in the horizontal and vertical directions which are obtained by multiplying the numbers of pixels in the horizontal and vertical directions of the image based on the image signal by a reciprocal of the electronic zoom magnification.

The setting table 100 shown in FIG. 2 is used when the desired image size is 640×480 pixels. The multi-stage electronic zoom magnifications are set between 1× and 4.5×. The electronic zoom magnification of 4.5× is the maximum magnification causing no deterioration in the image quality.

The reading mode 100b may be set to three types of reading modes including the entire pixel mode, 2×2 pixel-addition mode and 3×3 pixel-addition mode. The 3×3 pixel-addition mode is set between 1× and 1.5× of the electronic zoom magnification, the 2×2 pixel-addition mode is set between 1.5× and 2.25×, and the entire pixel mode is set between 2.25× and 4.5×.

In the entire pixel mode, signal charges of the entire effective pixels are read out from the CCD image sensor 3 by use of a general frame-reading process. In the 2×2 pixel-addition mode, two pixels in horizontal and vertical directions are used for the pixel-addition and signal charges from the four pixels are additionally read out as a signal corresponding to one pixel. In the 3×3 pixel-addition mode, three pixels in horizontal and vertical directions are used for the pixel-addition and signal charges from the nine pixels are read out as a signal corresponding to one pixel.

The image signal reading method in the 2×2 pixel-addition mode and 3×3 pixel-addition mode will be described hereinafter. FIGS. 3A, 3B, 4A and 4B are schematic diagrams of the CCD image sensor 3.

As shown in the drawings, the CCD image sensor 3 includes a large number of light receiving elements (indicated by R, G, B in the drawings) serving as the pixels, vertical transfer units 33, a horizontal transfer unit 31, and an output circuit 32. The vertical transfer unit 33 is formed of a vertical column of CCDs and transfers vertically the signal charges from the pixels (light receiving elements). The horizontal transfer unit 31 is formed of a horizontal row of CCDs and transfers horizontally the signal charges output from the vertical transfer units 33.

Figure 3B:
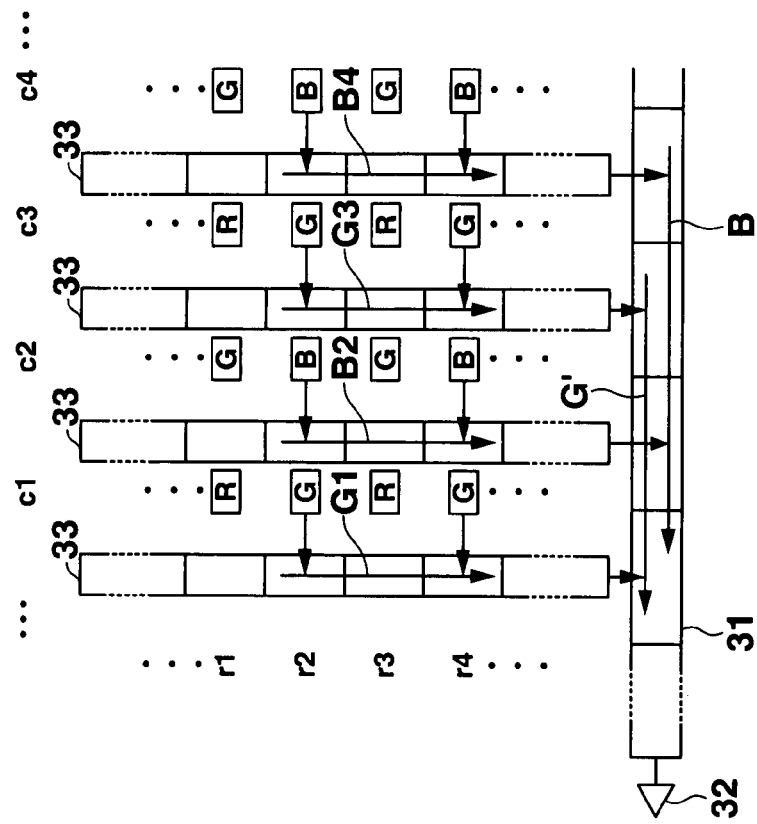
FIGS. 3A and 3B are schematic diagrams showing an image signal reading method of a 2×2 pixel-addition mode in a CCD image sensor.
Figure 3A:
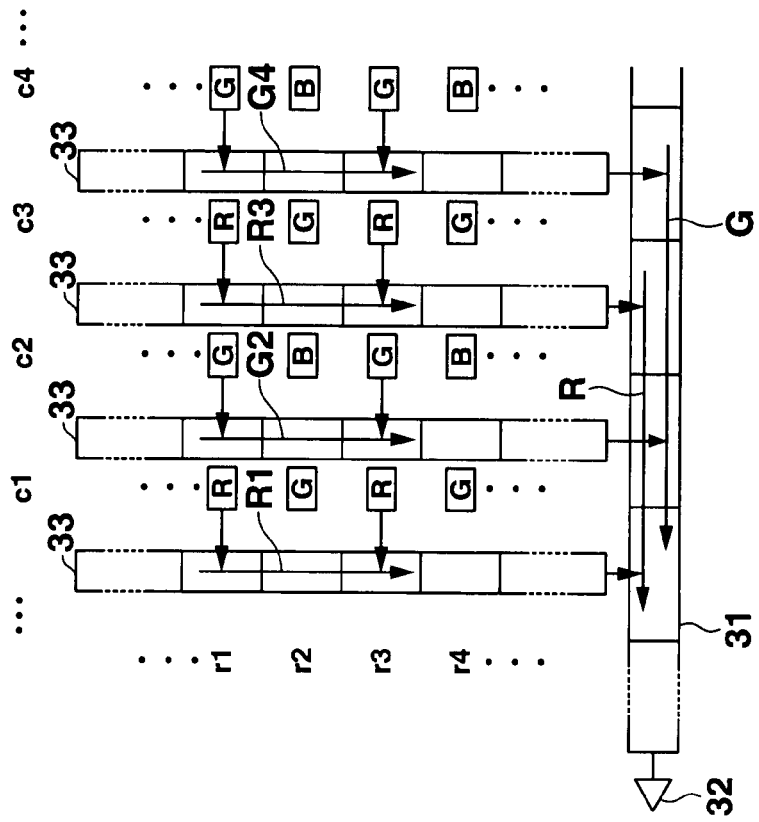

In the first field (odd field) of the 2×2 pixel-addition mode, signal charges extracted from pixels on odd-numbered rows are transferred to the vertical transfer units 33 as shown in FIG. 3A. In the vertical transfer unit 33, a vertical addition is performed so that signal charges from two pixels are added together. The two pixels are located at successive odd-numbered rows in a column. That is, the signal charges from the two pixels of the same color component in one column are vertically added together to produce a vertical-addition signal. The vertical-addition signal is transferred vertically to the horizontal transfer unit 31 through the vertical transfer unit 33.

In the horizontal transfer unit 31, vertical-addition signals are added together (horizontal addition). The horizontal addition is performed on the vertical-addition signals of the same color component sent from every other vertical transfer unit 33, for example, odd-numbered columns or even-numbered columns. A 2×2 pixel-addition signal formed by the horizontal addition is output from the output circuit 32.

The vertical and horizontal additions are sequentially performed on remaining columns and odd-numbered rows.

In the second field (even field) of the 2×2 pixel-addition mode, signal charges extracted from pixels on even-numbered rows are transferred to the vertical transfer units 33 as shown in FIG. 3B. In the vertical transfer unit 33, the vertical addition is performed so that signal charges from two pixels are added together. The two pixels are located at successive even-numbered rows in a column. That is, the signal charges from the two pixels of the same color component are vertically added together to produce a vertical-addition signal. The vertical-addition signal is sent to the horizontal transfer unit 31 through the vertical transfer unit 33.

In the horizontal transfer unit 31, vertical-addition signals are added together (horizontal addition). The horizontal addition is performed on the vertical-addition signals of the same color component sent from every other vertical transfer unit 33, for example, odd-numbered columns or even-numbered columns. A 2×2 pixel-addition signal formed by the horizontal addition is output from the output circuit 32.

The vertical and horizontal additions are sequentially performed on remaining columns and even-numbered rows. The signals formed by the vertical and horizontal additions are sequentially output from the output circuit 32.

FIGS. 3A and 3B are schematic diagrams showing a partial configuration of the CCD image sensor 3. The rows represented by r1 to r4 are four succeeding rows. Note that the rows r1 and r3 are the odd-numbered rows. The columns represented by c1 to c4 are four successive columns selected arbitrarily.

In the odd field shown in FIG. 3A, the vertical addition is performed on the signal charges of the red component in the odd-numbered rows r1 and r3 as follows:

Signal charges of the pixels located at (r1, c1) and (r3, c1) are added together to generate a vertical-addition signal R1; and Signal charges of the pixels located at (r1, c3) and (r3, c3) are added together to generate a vertical-addition signal R3.

The vertical-addition signals R1 and R3 are sent to the horizontal transfer unit 31. A signal R is derived from the horizontal addition of R1 and R3. The signal R is output from the output circuit 32.

The vertical addition is performed on the signal charges of the green component in the odd-numbered rows r1 and r3 as follows:

Signal charges of the pixels located at (r1, c2) and (r3, c2) are added together to generate a vertical-addition signal G2; and Signal charges of the pixels located at (r1, c4) and (r3, c4) are added together to generate a vertical-addition signal G4.

The vertical-addition signals G2 and G4 are added together (horizontal addition) to generate a signal G. The signal G is output from the output circuit 32.

Likewise, for the remaining odd-numbered rows and columns, the vertical and horizontal additions are performed. The results of the vertical and horizontal additions are output from the output circuit 32.

In the even field shown in FIG. 3B, the vertical addition is performed on the signal charges of the green component in the even-numbered rows r2 and r4 as follows:

Signal charges of the pixels located at (r2, c1) and (r4, c1) are added together to generate a vertical-addition signal G1; and Signal charges of the pixels located at (r2, c3) and (r4, c3) are added together to generate a vertical-addition signal G3.

The vertical-addition signals G1 and G3 are sent to the horizontal transfer unit 31. A signal G' is obtained by the horizontal addition of G1 and G3. The signal G' is output from the output circuit 32.

The vertical addition is performed on the signal charges of the blue component in the even-numbered rows r2 and r4 as follows:

Signal charges of the pixels located at (r2, c2) and (r4, c2) are added together to generate a vertical-addition signal B2; and Signal charges of the pixels located at (r2, c4) and (r4, c4) are added together to generate a vertical-addition signal B4.

The vertical-addition signals B2 and B4 are added together (horizontal addition) to generate a signal B. The signal B is output from the output circuit 32.

The vertical and horizontal additions are sequentially performed on signal charges of the pixels in the remaining even-numbered rows and columns. The signals resulting from the vertical and horizontal additions are sequentially output from the output circuit 32.

Figures 5A, 5B:
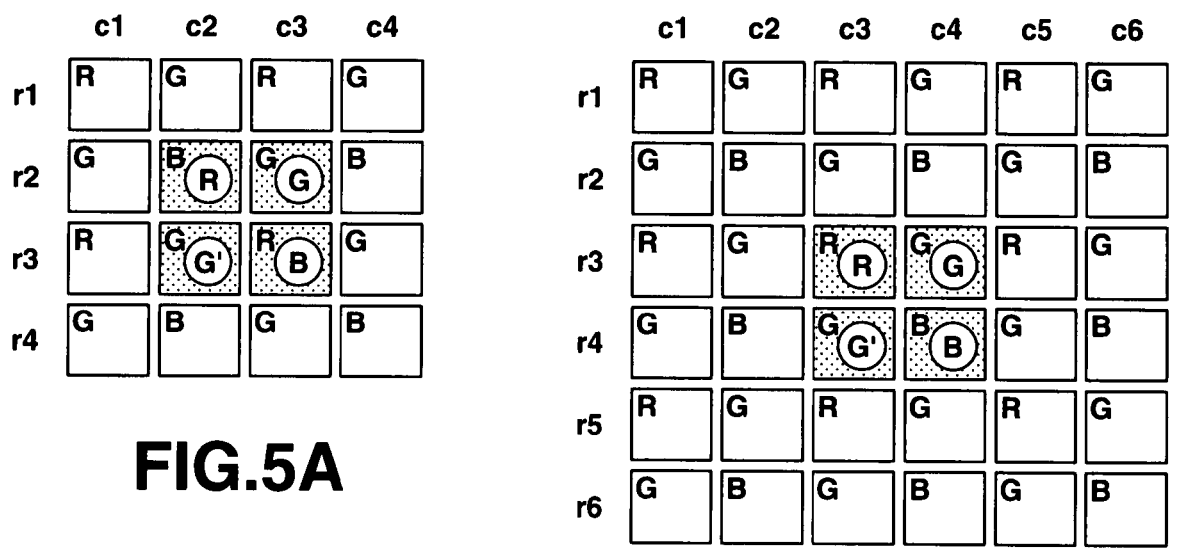

FIG. 5A is a conceptual diagram showing Bayer data read out from a 4×4 pixel space in the 2×2 pixel-addition mode.

A signal R is obtained by the vertical and horizontal additions on the signal charges extracted from the pixels of the red component located at (r1, c1), (r1, c3), (r3, c1) and (r3, c3). The signal R is read out as a signal corresponding to the pixel located at (r2, c2).

Likewise, a signal G is obtained from the signal charges of the pixels of the green component located at (r1, c2), (r1, c4), (r3, c2) and (r3, c4). The signal G is read out as a signal corresponding to the pixel located at (r2, c3).

A signal G' is derived from the signal charges of the pixels of the green component located at (r2, c1), (r2, c3), (r4, c1) and (r4, c3). The signal G' is read out as a signal corresponding to the pixel located at (r3, c2).

A signal B is obtained from the signal charges of the pixels of the blue component located at (r2, c2), (r2, c4), (r4, c2) and (r4, c4). The signal B is read out as a signal corresponding to the pixel located at (r3, c3).

As described above, the Bayer data of 2×2 pixels is generated from the 4×4 pixel data by halving the number of pixels in horizontal and vertical directions. The Bayer data contains information of the 4×4 pixel data.

When the number of pixels is increased, reading out the captured image signal in the 2×2 pixel-addition mode can reduce the number of pixels similarly.

In the case where the number of the effective pixels of the CCD image sensor 3 is 2880×2160 pixels and the captured image data is read out in the 2×2 pixel-addition mode, Bayer data with 1440×1080 pixels is obtained.

Figure 4B:
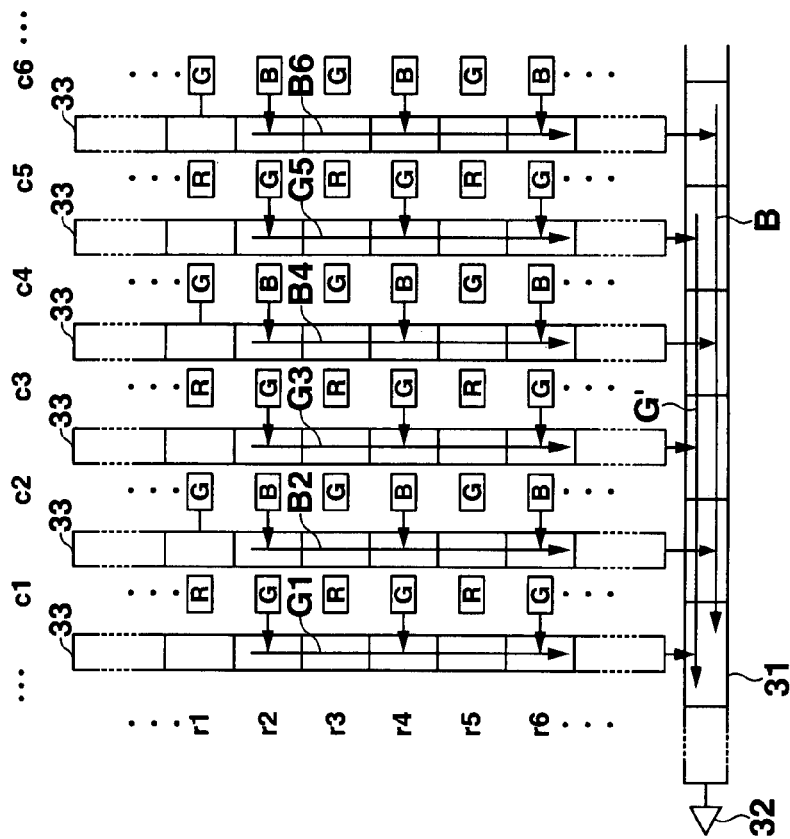
FIGS. 4A and 4B are schematic diagrams showing an image signal reading method of a 3×3 pixel-addition mode in the CCD image sensor.
Figure 4A:
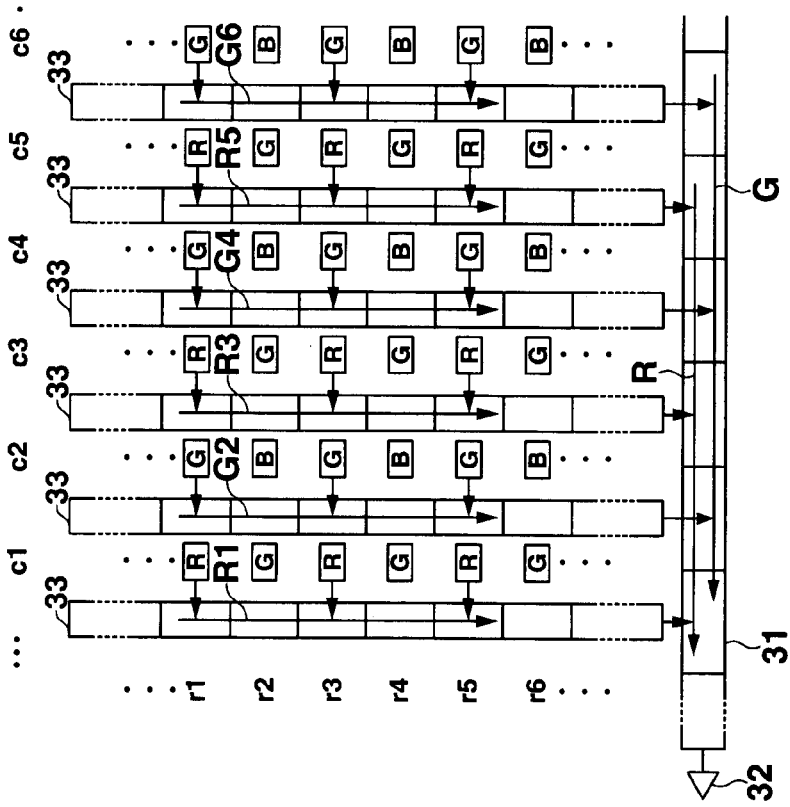

In the first field (odd field) of the 3×3 pixel-addition mode, signal charges extracted from pixels on odd-numbered rows are transferred to the vertical transfer units 33 as shown in FIG. 4A. In the vertical transfer unit 33, a vertical addition is performed so that signal charges from three pixels are added together. The three pixels are located at three successive odd-numbered rows. That is, the signal charges from the three pixels of the same color component in one column are vertically added together to produce a vertical-addition signal. The vertical-addition signal is transferred vertically to the horizontal transfer unit 31 through the vertical transfer unit 33.

In the horizontal transfer unit 31, vertical-addition signals are added together (horizontal addition). The horizontal addition is performed on the vertical-addition signals of the same color component sent from every other vertical transfer unit 33, for example, odd-numbered columns or even-numbered columns. A 3×3 pixel-addition signal formed by the horizontal addition is output from the output circuit 32.

The vertical and horizontal additions are sequentially performed on remaining columns and odd-numbered rows. The results of the vertical and horizontal additions are sequentially output from the output circuit 32.

In the second field (even field) of the 3×3 pixel-addition mode, signal charges extracted from pixels on even-numbered rows are transferred to the vertical transfer units 33 as shown in FIG. 4B. In the vertical transfer unit 33, the vertical addition is performed so that signal charges from three pixels are added together. The three pixels are located at successive even-numbered rows in a column. That is, the signal charges from the three pixels of the same color component are vertically added together to produce a vertical-addition signal. The vertical-addition signal is sent to the horizontal transfer unit 31 through the vertical transfer unit 33.

In the horizontal transfer unit 31, vertical-addition signals are added together (horizontal addition). The horizontal addition is performed on the vertical-addition signals of the same color component sent from every other vertical transfer unit 33, for example, odd-numbered columns or even-numbered columns. A 3×3 pixel-addition signal formed by the horizontal addition is output from the output circuit 32.

FIGS. 4A and 4B are schematic diagrams showing a partial configuration of the CCD image sensor 3. The rows represented by r1 to r6 are six succeeding rows. Note that the rows r1, r3 and r5 are the odd-numbered rows. The columns represented by c1 to c6 are six successive columns selected arbitrarily.

In the odd field shown in FIG. 4A, the vertical addition is performed on the signal charges of the red component in the odd-numbered rows r1, r3 and r5 as follows:

Signal charges of the pixels located at (r1, c1), (r3, c1) and (r5, c1) are added together to generate a vertical-addition signal R1;

Signal charges of the pixels located at (r1, c3), (r3, c3) and (r5, c3) are added together to generate a vertical-addition signal R3; and Signal charges of the pixels located at (r1, c5), (r3, c5) and (r5, c5) are added together to generate a vertical-addition signal R5.

The vertical-addition signals R1, R3 and R5 are sent to the horizontal transfer unit 31. A signal R is derived from the horizontal addition of R1, R3 and R5. The signal R is output from the output circuit 32.

The vertical addition is performed on the signal charges of the green component in the odd-numbered rows r1, r3 and r5 as follows:

Signal charges of the pixels located at (r1, c2), (r3, c2) and (r5, c2) are added together to generate a vertical-addition signal G2;

Signal charges of the pixels located at (r1, c4), (r3, c4) and (r5, c4) are added together to generate a vertical-addition signal G4; and Signal charges of the pixels located at (r1, c6), (r3, c6) and (r5, c6) are added together to generate a vertical-addition signal G6.

The vertical-addition signals G2, G4 and G6 are added together (horizontal addition) to generate a signal G. The signal G is output from the output circuit 32.

Likewise, for the remaining odd-numbered rows and columns, the vertical and horizontal additions are performed sequentially. The results of the vertical and horizontal additions are output from the output circuit 32.

In the even field shown in FIG. 4B, the vertical addition is performed on the signal charges of the green component in the even-numbered rows r2, r4, and r6 as follows:

Signal charges of the pixels located at (r2, c1), (r4, c1) and (r6, c1) are added together to generate a vertical-addition signal G1;

Signal charges of the pixels located at (r2, c3), (r4, c3) and (r6, c3) are added together to generate a vertical-addition signal G3; and Signal charges of the pixels located at (r2, c5), (r4, c5) and (r6, c5) are added together to generate a vertical-addition signal G5.

The vertical-addition signals G1, G3 and G5 are sent to the horizontal transfer unit 31. A signal G' is obtained by the horizontal addition of G1, G3 and G5. The signal G' is output from the output circuit 32.

The vertical addition is performed on the signal charges of the blue component in the even-numbered rows r2, r4 and r6 as follows:

Signal charges of the pixels located at (r2, c2), (r4, c2) and (r6, c2) are added together to generate a vertical-addition signal B2;

Signal charges of the pixels located at (r2, c4), (r4, c4) and (r6, c4) are added together to generate a vertical-addition signal B4; and Signal charges of the pixels located at (r2, c6), (r4, c6) and (r6, c6) are added together to generate a vertical-addition signal B6.

The vertical-addition signals B2, B4 and B6 are added together (horizontal addition) to generate a signal B. The signal B is output from the output circuit 32.

The vertical and horizontal additions are sequentially performed on signal charges of the pixels in the remaining even-numbered rows and columns. The signals resulting from the vertical and horizontal additions are sequentially output from the output circuit 32.

FIG. 5B is a conceptual diagram showing Bayer data read out from a 6×6 pixel space in the 3×3 pixel-addition mode.

A signal R is obtained by the vertical and horizontal additions on the signal charges extracted from the pixels of the red component located at (r1, c1), (r1, c3), (r1, c5), (r3, c1), (r3, c3), (r3, c5), (r5, c1), (r5, c3) and (r5, c5). The signal R is read out as a signal corresponding to the pixel located at (r3, c3). Namely, signal charges from nine pixels are read out as a signal corresponding to one pixel in the 3×3 pixel-addition mode.

Thus, Bayer data of 2×2 pixels can be obtained by reducing the numbers of pixels of the 6×6 pixel data horizontally and vertically to one-third.

When the number of pixels is increased, reading out the captured image signal in the 3×3 pixel-addition mode can reduce the number of pixels similarly.

In the case where the number of the effective pixels of the CCD image sensor 3 is 2880×2160 pixels and the captured image data is read out in the 3×3 pixel-addition mode, Bayer data with 960×720 pixels can be obtained.

Another specific manner may be employed at the time of reading out an image signal in the 2×2 pixel-addition mode and 3×3 pixel-addition mode.

The image quality adjustment 100e in the setting table 100 stores degrees of the sharpening or softening process corresponding to the zoom magnifications. In the setting table 100 corresponding to the desired image size of 640×480 pixels shown in FIG. 2, the value of the electronic zoom magnification 10a ranges from 1× to 4.5× (zoom in). The reading mode of image signal is switched from the 3×3 pixel-addition mode to the 2×2 pixel-addition mode at the electronic zoom magnification of 1.5× (boundary magnification). The reading mode is switched from the 2×2 pixel-addition mode to the entire pixel mode at the boundary magnification of 2.25×. In a preset magnification range lower than the boundary magnification, the sharpening process is performed. The degree of the sharpening process gradually increases with the zoom magnification. The degree of the sharpening process comes to the maximum at the boundary magnification. When the zoom magnification reaches the boundary magnification, the image quality adjustment is switched from the sharpening process to the softening process. The softening process is performed in a preset magnification range higher than the boundary magnification. The degree of the softening process is set to the maximum at the boundary magnification. Moreover, the image quality (blurring level) at the boundary magnification resulting from the softening process should be equivalent to the image quality (blurring level) at the boundary magnification derived by the sharpening process. The degree of the softening process gradually decreases with the increase of the zoom magnification.

Figure 6:
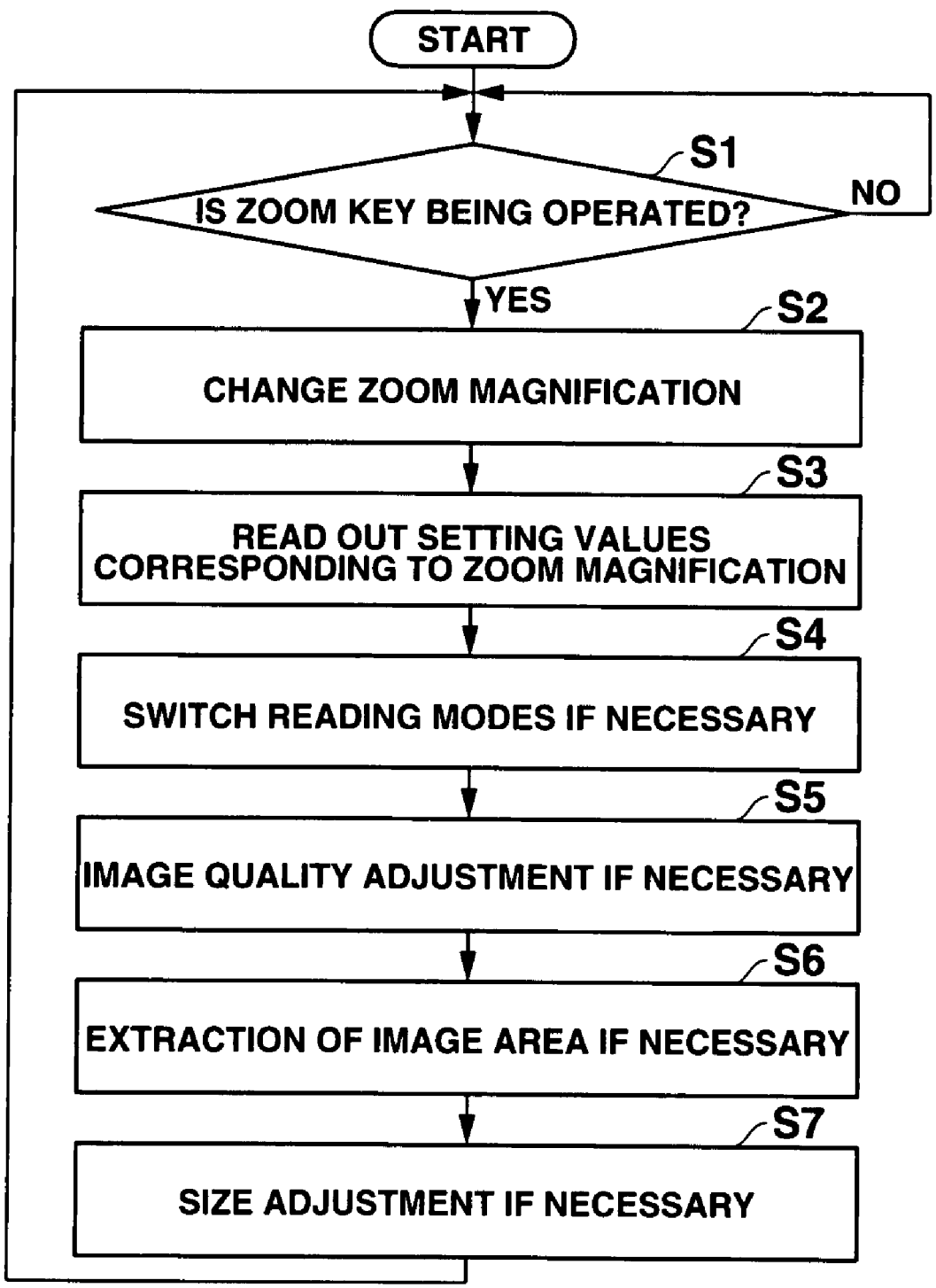
FIG. 6 is a flowchart of the electronic zoom control process executed by a CPU 13.

Next, the operation of the digital camera with the above configuration according to the present embodiment will be explained. FIG. 6 is a flowchart showing an electronic zoom control process performed by the CPU 13 in the moving or still image capturing mode. The electronic zoom control process is performed when the zoom magnification is set within an electronic zoom range. The electronic zoom range indicates the magnification range higher than a maximal optical zoom magnification which is realized only by driving the zoom lens of the optical system 2. When the user operates the zoom key ("YES" in step S1), the CPU 13 changes the setting of the electronic zoom magnification (step S2).

By referring to the setting table 100 (FIG. 2) corresponding to the desired image size prepared preliminarily, setting values (setting contents) of the respective setting items 100b to 100e are read out according to the changed electronic zoom magnification (step S3).

The following process is performed based on the read out setting values.

The reading mode of a captured image signal (Bayer data) from the CCD image sensor 3 is switched based on the setting value of the reading mode 100b (step S4).

The image quality of the captured image data is adjusted by the sharpening process or softening process depending on the setting of the image quality adjustment 100e (step S5).

An area corresponding to the setting of the extraction size 100c is extracted from the image data subjected to the image quality adjustment (step S6). The extraction process of step S6 is called "trimming." The scaling circuit 8 enlarges or reduces the extracted image area depending on the setting of the scaling factor 100d (step S7).

Image data of the desired image size can be obtained by the above electronic zoom control process.

Thereafter, every time the zoom key is operated, i.e., every time the electronic zoom magnification is changed, the process of steps S2 to S7 is repeatedly performed. In addition, while the electronic zoom magnification is kept unchanged, the setting values of the setting items 100b to 100e keep the setting corresponding to the unchanged electronic zoom magnification. The process based on the setting values is repeatedly performed on a moving image or a through image.

Figure 7:
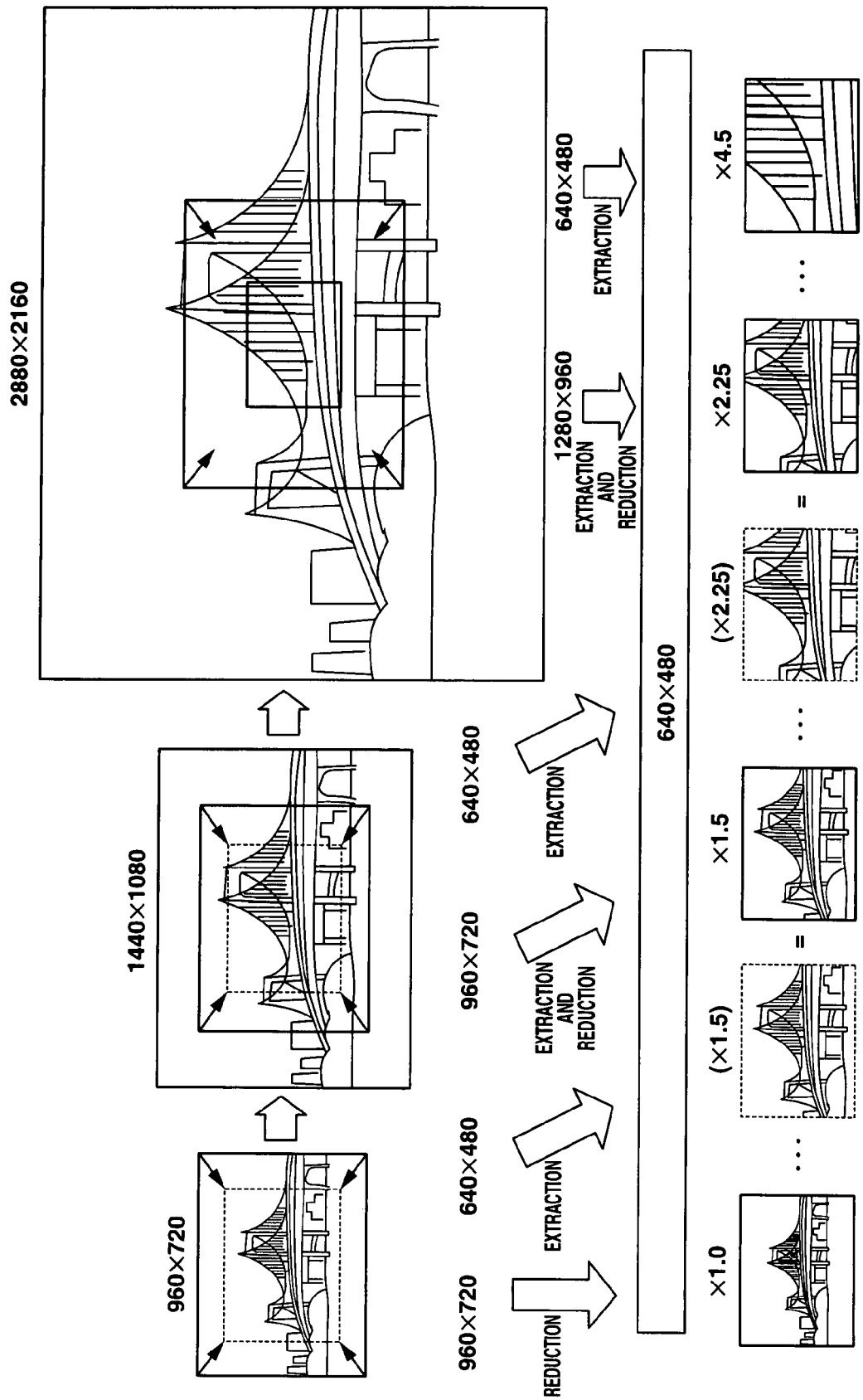
FIG. 7 is a view showing an example of a storage image in the electronic zoom control process in the moving image capturing mode.

(1) The case in which the desired image size is "640×480" pixels:

FIG. 7 is a view showing the concrete contents of the electronic zoom control process based on the setting table 100 shown in FIG. 2. The setting table 100 shown in FIG. 2 corresponds to the desired image size of 640×480 pixels. In the present example, it is assumed that the user changes the electronic zoom magnification from 1× to 4.5× (maximum magnification) in the moving image capturing mode.

When the electronic zoom magnification is firstly set to 1×, the reading mode of an image signal is set to the 3×3 pixel-addition mode. The number of pixels contained in one frame of the captured image data is set to "960×720" for storage in the internal memory 14. The YUV data of 960×720 pixels is scaled to become a storage image (frame image) having the desired image size (640×480 pixels).

Within the electronic zoom magnification range between 1× and 1.5× (boundary magnification), gradual reduction of the extraction size from the YUV data is accompanied by gradual increase of the scaling factor (gradual decrease of the reduction ratio) in response to the increase of the electronic zoom magnification (zoom in). The desired image size of 640×480 pixels can be attained by performing the extraction process and reduction process.

When an area of 640×480 pixels is extracted from the captured image data of 960×720 pixels read out in the 3×3 pixel-addition mode, the extracted area as is corresponds to an image of 1.5× electronic zoom magnification. The reduction process is not necessary at the electronic zoom magnification of 1.5×. The electric zoom magnification of 1.5× is set as the boundary magnification. Since the scaling factor is 100% at the electric zoom magnification of 1.5×, the desired image size of 640×480 pixels can be attained only by performing the extraction process.

When the electronic zoom magnification reaches 1.5× (boundary magnification), the reading mode of the image signal is switched to the 2×2 pixel-addition mode. The number of pixels contained in one frame of the captured image data is set to "1440×1080" for storage in the internal memory 14.

Within the electronic zoom magnification range between 1.5× and 2.25×, gradual reduction of the extraction size from the YUV data is accompanied by gradual increase of the scaling factor (gradual decrease of the reduction ratio) in response to the increase of the electronic zoom magnification. The storage image having the desired image size of 640×480 pixels can be attained by performing the extraction process and the reduction process.

When an area of 640×480 pixels is extracted from the captured image data of 1440×1080 pixels read out in the 2×2 pixel-addition mode, the extracted area as is corresponds to an image of 2.25× electronic zoom magnification without the reduction process. The electric magnification of 2.25× is set as the boundary magnification. Since the scaling factor is 100% at the electronic zoom magnification of 2.25×, the desired image size of 640×480 pixels can be attained only by the extraction process.

When the electronic zoom magnification reaches 2.25× (boundary magnification), the reading mode of the image signal is switched to the entire pixel mode. The number of pixels contained in one frame of the captured image data is set to "2880×2160" for storage in the internal memory 14.

Within the electronic zoom magnification range between 2.25× and 4.5×, gradual reduction of the extraction size from the YUV data is accompanied by gradual increase of the scaling factor (gradual decrease of the reduction ratio) in response to the increase of the electronic zoom magnification. The storage image having the desired image size of 640×480 pixels can be attained by performing the extraction process and reduction process. Since the scaling factor is 100% at the electric zoom magnification of 4.5×, i.e., the maximum magnification, the desired image size of 640×480 pixels can be attained without the scaling process but only by the extraction process.

Further, the sharpening process or softening process is performed as the image quality adjustment in parallel with the above extraction process and the reduction process.

While the electronic zoom magnification is being increased (zoom in), the contents of the image quality adjustment are changed from the sharpening process to the softening process at the boundary magnifications (1.5× and 2.25×). The sharpening process is performed in a preset lower magnification range A, which is located on the lower magnification side compared to the boundary magnification (refer to FIG. 8). In the lower magnification range A, the processing degree of the sharpening process gradually increases with the electronic zoom magnification and ends up the maximum degree at the boundary magnification. The softening process is performed in a preset higher magnification range B on the higher magnification side with respect to the boundary magnification (refer to FIG. 8). In the higher magnification range B, the processing degree of the softening process is set to the maximum at the boundary magnification. Then, the processing degree of the softening process gradually decreases with the increase of the electronic zoom magnification.

Figure 8:
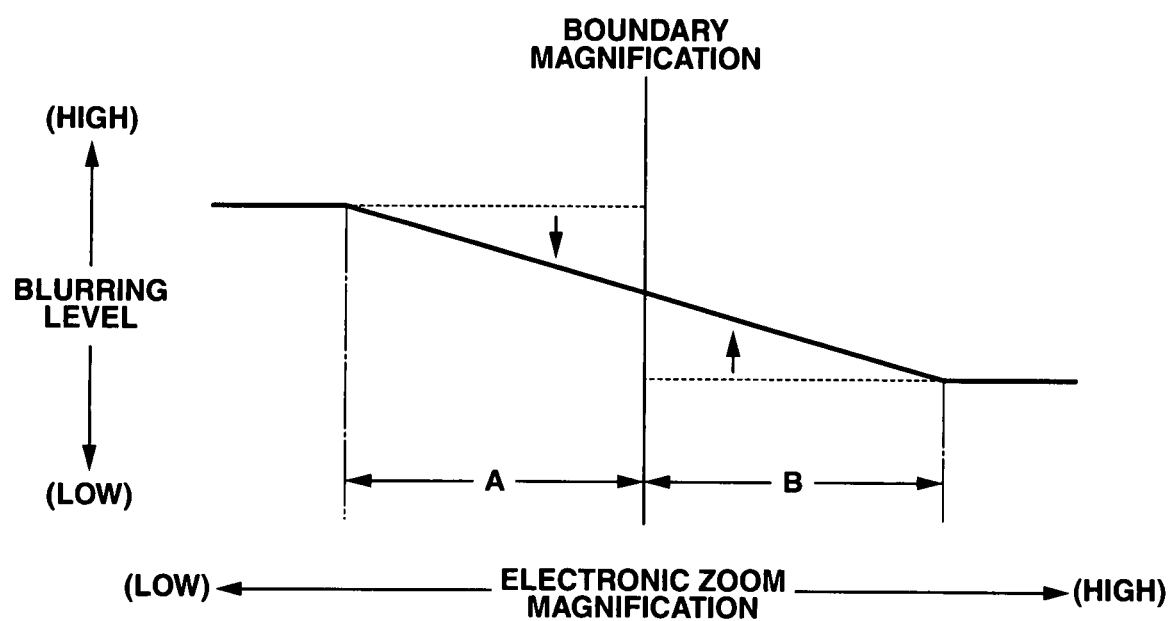
FIG. 8 is a diagram showing a blurring level of an image in the vicinity of a zoom magnification where the reading mode is switched.

FIG. 8 is a schematic diagram showing the level of blurring on the captured image. That is, FIG. 8 is a diagram showing a variation in the blurring level of the storage image within the lower magnification range A and the higher magnification range B. The solid line in FIG. 8 indicates the blurring level according to the present embodiment. The broken lines indicate the blurring level in the case where the image quality adjustment (sharpening process or softening process) is not performed.

As indicated by the broken lines in FIG. 8, the blurring level is discontinuous at the boundary magnification. That is, switching the reading mode of the image signal causes the considerable change in quality of the captured image. Switching the reading mode leads to the change in the number of pixels utilized for the pixel-addition. The change in the image quality is due to the change in the numbers of the pixels for the pixel-addition. The increase in the number of pixels for the pixel-addition results in heightening the blurring level by extinguishing the edge part or lowering the contrast. The above significant change in the image quality cannot be eliminated by the electronic zoom control provided only by performing the extraction process and the reduction process.

However, the boundary magnification (1.5× and 2.25×) divides the contents of the image quality adjustment in the above example according to the present embodiment. Namely, the sharpening process (first image quality adjusting process) is performed in the lower magnification range A and the softening process (second image quality adjusting process) is performed in the higher magnification range B. The processing degrees of the sharpening process and softening process are set to the maximum at the boundary magnification. That is, the opposite types of the image quality adjustment are performed in the preset magnification ranges located on both sides of the boundary magnification and the processing degrees thereof are set to the maximum at the boundary magnification. Accordingly, the blurring level changes continuously at the boundary magnification (as indicated by the solid line in FIG. 8). Therefore, the quality of the electronic zoom function can be further enhanced by eliminating a large variation in the image quality caused by switching the reading mode of the image signal.

Even when the electronic zoom magnification is changed from the higher magnification side to the lower magnification side, the electronic zoom function with which the blurring level is continuous at the boundary magnification can be realized.

Figure 9B:
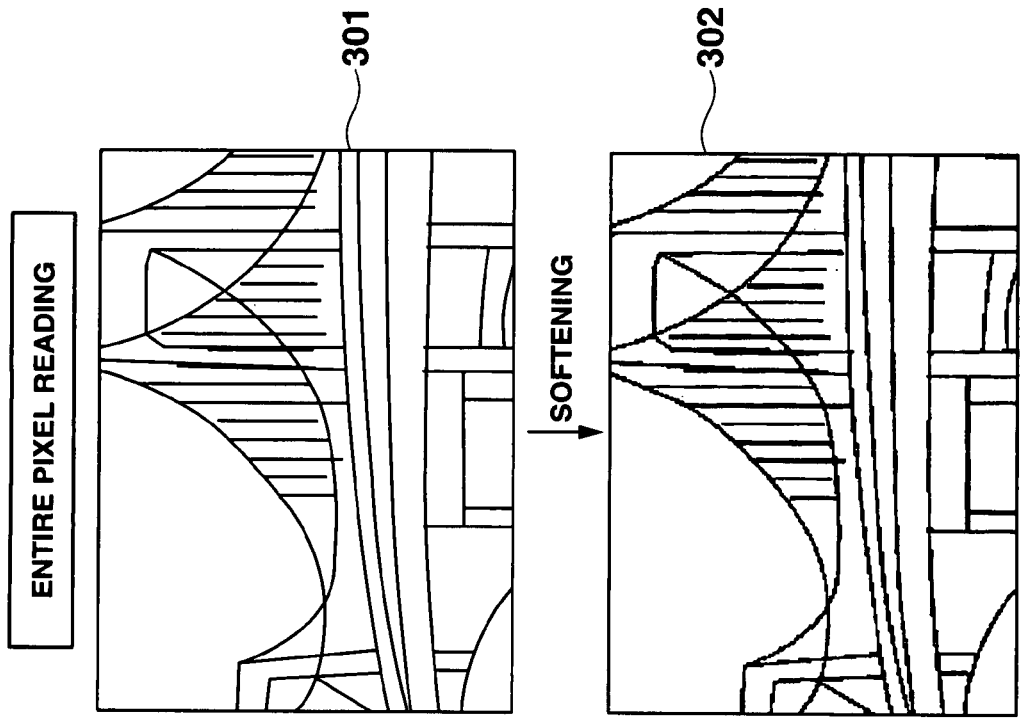
FIGS. 9A and 9B are views for schematically showing a suppression effect of an image quality variation in the vicinity of a zoom magnification where the reading mode is switched.
Figure 9A:
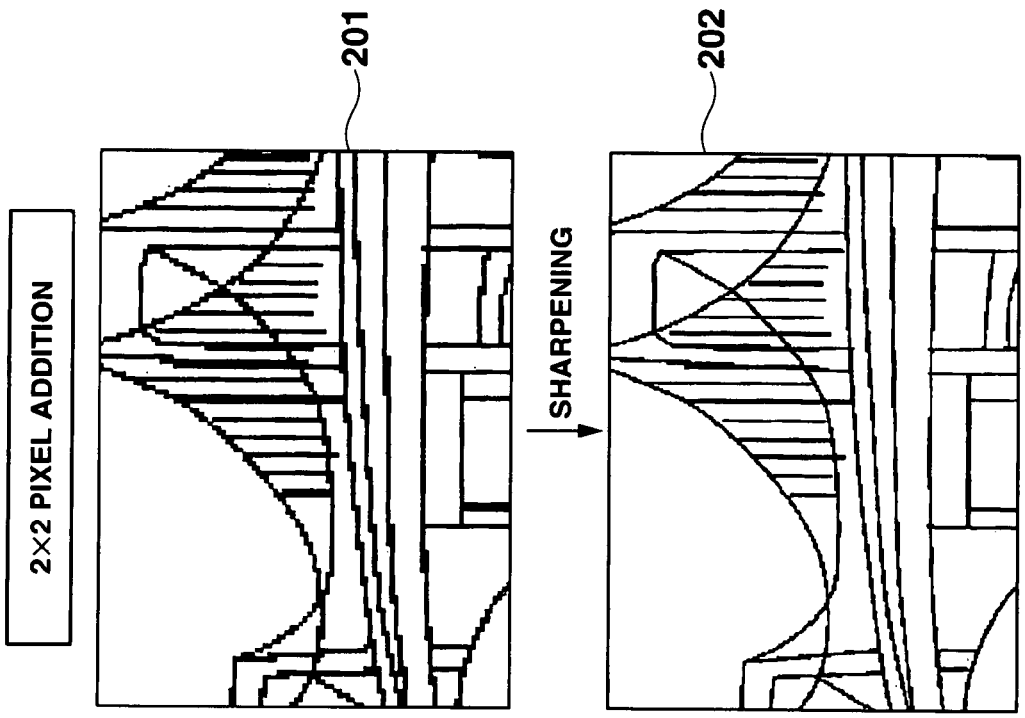

FIGS. 9A and 9B are schematic views showing the blurring level of the captured image corresponding to the electronic zoom magnification of 2.25× (boundary magnification) in the example shown in FIG. 7. An original image 201 shown in FIG. 9A indicates an image obtained by extracting 640×480 pixels from the captured image read out in the 2×2 pixel-addition mode. A storage image 202 represents an image obtained from the original image 201 with the sharpening process by the maximum degree. An original image 301 in FIG. 9B shows an image obtained by extracting "1260×960" pixels from the captured image read out in the "entire pixel mode" and reducing the extracted area by 50%. A storage image 302 represents an image obtained from the original image 301 with the softening process by the maximum degree.

When the original images 201 and 301 are compared with each other, a large difference is recognized between the image qualities thereof. However, a large difference is not recognized between the storage images 202 and 302 subjected to the image quality adjustment.

The effects described above are not limited to the moving image capturing in the moving image capturing mode. The above effects can be attained when the through image is being displayed on the LCD 12 in the standby state by performing the electronic zoom control process shown in FIG. 6 based on the setting table 100 corresponding to the size of a through image in both of the moving image capturing mode and the still image capturing mode.

The electronic zoom control process shown in FIG. 6 can be executed not only in the standby state but also at the time of capturing the still image in the still image capturing mode. The electronic zoom control process may be performed depending on one of the prepared setting tables corresponding to sizes of the storage image (except the maximum size) which can be set preliminarily.

When the desired image size is set to 640×480 pixels, an image of 640×480 pixels is obtained by the combination of the extraction process and the reduction process. However, there may be a case in which the desired image size is obtained by the combination of the extraction process and the enlargement process as described hereinafter.

(2) The case in which the desired image size is "960×720" pixels:

The concrete contents of the electronic zoom control process in which the desired image size is set to 960×720 pixels are explained below with reference to FIG. 10. In order to execute the electronic zoom control process, a setting table (not shown) for the present example stores different setting data from the setting table 100 shown in FIG. 2. In the present example, the electronic zoom magnification where the reading mode of the image signal is switched (boundary magnification) is set to 1.5× and 3×.

Figure 10:
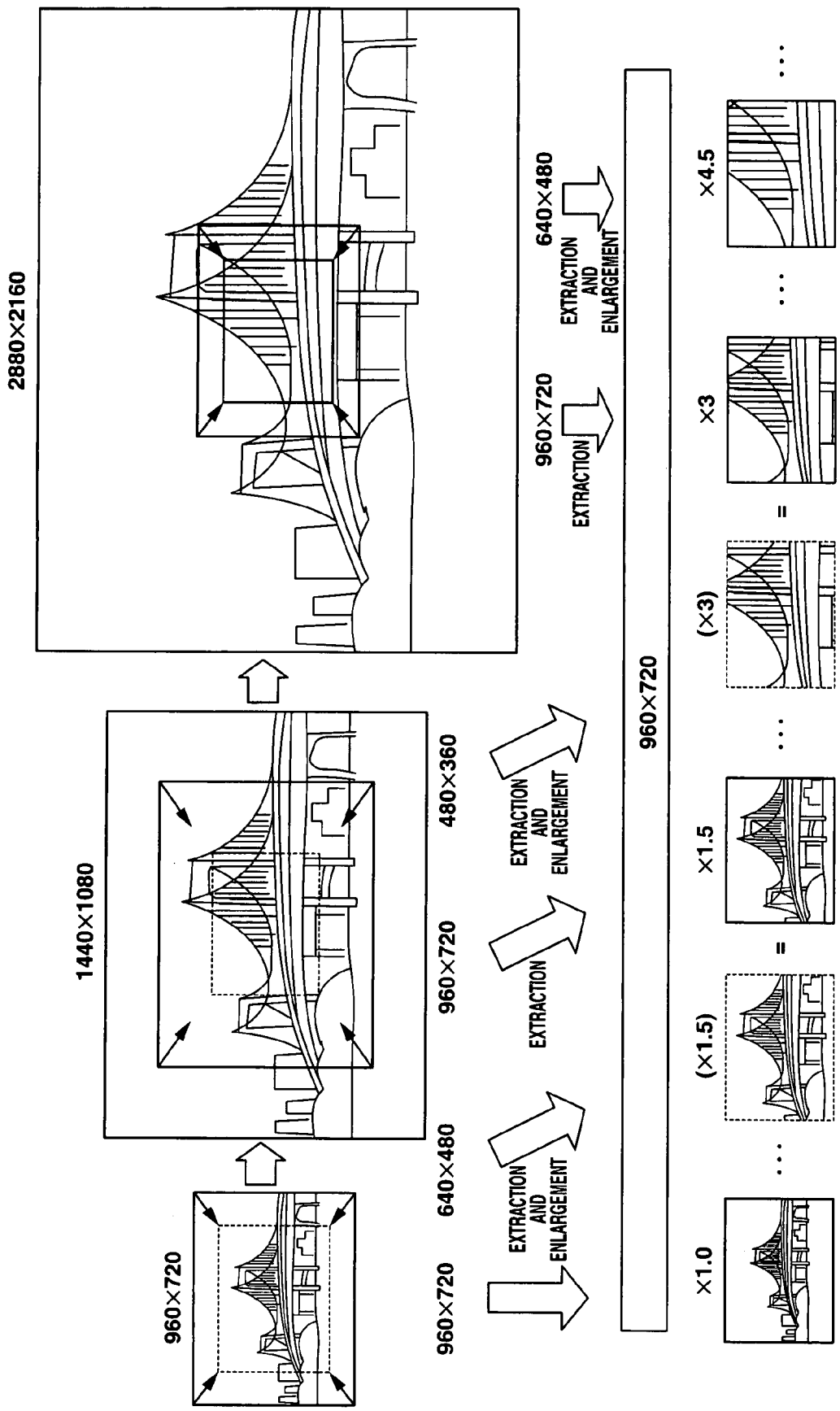
FIG. 10 is a view showing another example of the storage image in the electronic zoom control process in the moving image capturing mode.

As shown in FIG. 10, when the electronic zoom magnification is 1×, the reading mode of the captured image signal is set to the 3×3 pixel-addition mode. The number of pixels contained in one frame of the captured image data is set to "960×720" for storage in the internal memory 14. Since the desired image size is 960×720 pixels, it is not necessary to perform the extraction process and enlargement process at 1×. The read out YUV data is stored as is as a storage image (frame image).

Within the electronic zoom magnification range between 1× and 1.5×, gradual reduction of the extraction size from the YUV data is accompanied by gradual increase of the scaling factor (enlargement ratio) in response to the increase of the electronic zoom magnification. The desired image size of 960×720 pixels can be attained by performing the extraction process and the enlargement process.

When an area of 960×720 pixels is extracted from the captured image data of 1,440×1,080 pixels read out in the 2×2 pixel-addition mode, the extracted area as is corresponds to an image of 1.5× electronic zoom magnification. The enlargement process is not necessary at the electronic zoom magnification of 1.5×. The electronic zoom magnification of 1.5× is set as the boundary magnification.

When the electronic zoom magnification reaches 1.5× (boundary magnification), the reading mode of the image signal is switched from the 3×3 pixel-addition mode to the 2×2 pixel-addition mode. The number of pixels contained in one frame of the captured image data is set to "1,440×1,080" for storage in the internal memory 14. Since the extraction size is set to 960×720 pixels and the scaling factor is set to 100% at the electric zoom magnification of 1.5×, the desired image size of 960×720 pixels can be attained only by the extraction process.

Within the electronic zoom magnification range between 1.5× and 3×, gradual reduction of the extraction size from the YUV data is accompanied by gradual increase of the scaling factor (enlargement ratio) in response to the increase of the electronic zoom magnification. The desired image size of 960×720 pixels can be attained by performing the extraction process and the enlargement process.

When an area of 960×720 pixels is extracted from the captured image data of 2,880×2,160 pixels read out in the entire pixel mode, the extracted area as is corresponds to an image of 3× electronic zoom magnification. The enlargement process is not necessary at the electronic zoom magnification of 3×. The electric zoom magnification of 3× is set as the boundary magnification.

When the electronic zoom magnification reaches 3× (boundary magnification), the reading mode of the image signal is switched from the 2×2 pixel-addition mode to the entire pixel mode. The number of pixels contained in one frame of the captured image data is set to "2,880×2160" for storage in the internal memory 14. Since the extraction size is set to 960×720 pixels and the scaling factor is set to 100% at the electric zoom magnification of 3×, the desired image size of 960×720 pixels can be attained only by performing the extraction process.

When the setting of the electronic zoom magnification is higher than 3×, gradual reduction of the extraction size from the YUV data is accompanied by gradual increase of the scaling factor (enlargement ratio) in response to the increase of the electronic zoom magnification. The desired image size of 960×720 pixels can be attained by performing the extraction process and the enlargement process.

Further, the sharpening process or softening process is performed as the image quality adjustment in parallel with the above extraction process and the reduction process.

While the electronic zoom magnification is being increased (zoom in), the contents of the image quality adjustment are changed from the sharpening process to the softening process at the boundary magnifications (1.5× and 3×). The sharpening process is performed in a preset lower magnification range, which is located on the lower magnification side compared to the boundary magnification. In the lower magnification range, the processing degree of the sharpening process gradually increases with the electronic zoom magnification and ends up the maximum degree at the boundary magnification. The softening process is performed in a preset higher magnification range on the higher magnification side with respect to the boundary magnification. In the higher magnification range, the processing degree of the softening process is set to the maximum at the boundary magnification. Then, the processing degree of the softening process gradually decreases with the increase of the electronic zoom magnification (refer to FIG. 8).

When the reading mode of the image signal is switched, the quality of the captured image is inevitably changed. Moreover, since the number of pixels required for the desired image size is obtained by the enlargement process in the lower magnification range, the quality of the image is lowered.

However, the boundary magnification (1.5× and 3×) divides the contents of the image quality adjustment in the present example. Namely, the sharpening process is performed in the lower magnification range and the softening process is performed in the higher magnification range. The processing degrees of the sharpening process and the softening process are set to the maximum at the boundary magnifications. That is, the image quality changes continuously in the preset magnification ranges located on both sides of the boundary magnification without a significant gap. Accordingly, the blurring level changes continuously at the boundary magnification as indicated by the solid line in FIG. 8.

Even when the electronic zoom magnification is changed from the higher magnification side to the lower magnification side, the electronic zoom function with which the blurring level is continuous at the boundary magnification can be realized.

(3) The case in which the desired image size is "800×600" pixels:

The concrete contents of the electronic zoom control process in which the desired image size is set to "800×600" pixels are explained below with reference to FIG. 11. In order to execute the electronic zoom control process, a setting table (not shown) for the present example stores different setting data from the setting table 100 shown in FIG. 2. In the present example, the electronic zoom magnification where the reading mode of the image signal is switched (boundary magnification) is set to 1.6× and 2.6×.

Figure 11:
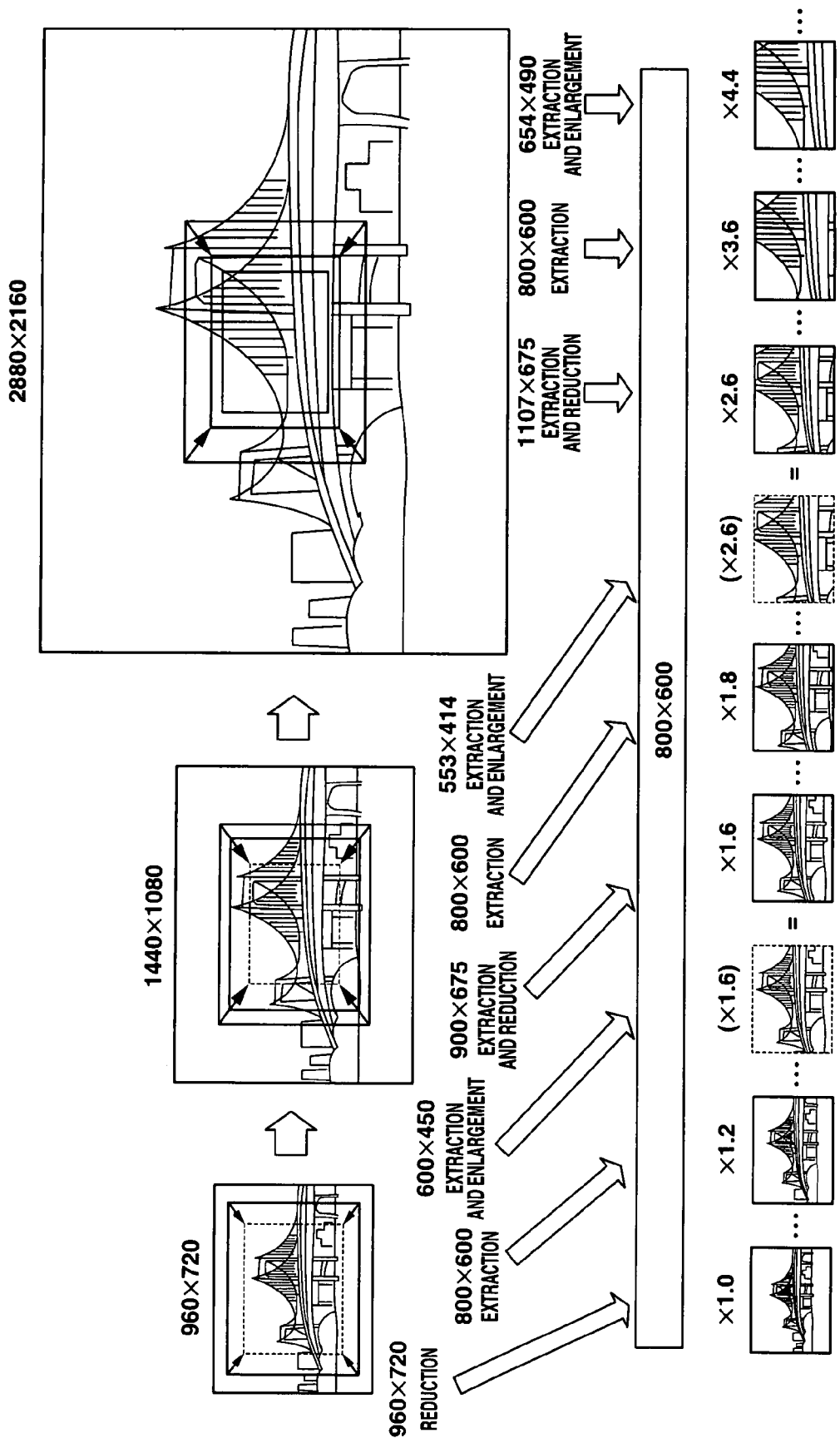
FIG. 11 is a view showing still another example of the storage image in the electronic zoom control process in the moving image capturing mode.

As shown in FIG. 11, when the electronic zoom magnification is 1×, the reading mode of the captured image signal is set to the 3×3 pixel-addition mode. The number of pixels contained in one frame of the captured image data is set to "960×720" for storage in the internal memory 14. Only the reduction process is performed on the YUV data to attain the desired image size (800×600 pixels).

Within the electronic zoom magnification range between 1× and 1.2×, gradual reduction of the extraction size from the YUV data is accompanied by gradual increase of the scaling factor (gradual decrease of the reduction ratio) in response to the increase of the electronic zoom magnification. The desired image size of 800×600 pixels can be attained by performing the extraction process and the reduction process.

When an area of 800×600 pixels is extracted from the captured image data of 960×720 pixels read out in the 3×3 pixel-addition mode, the extracted area as is corresponds to an image of 1.2× electronic zoom magnification. The scaling process (enlargement or reduction) is not necessary at the electronic zoom magnification of 1.2×. Since the scaling factor is 100% at the electric zoom magnification of 1.2×, the desired image size of 800×600 pixels can be obtained only by the extraction process.

Within the electronic zoom magnification range between 1.2× and 1.6×, gradual reduction of the extraction size from the YUV data is accompanied by gradual increase of the scaling factor (enlargement ratio) in response to the increase of the electronic zoom magnification. The desired image size of 800×600 pixels can be attained by performing the extraction process and the enlargement process.

When the electronic zoom magnification reaches 1.6× (boundary magnification), the reading mode of the image signal is switched from the 3×3 pixel-addition mode to the 2×2 pixel-addition mode. The number of pixels contained in one frame of the captured image data is set to "1,440×1,080" for storage in the internal memory 14.

Within the electronic zoom magnification range between 1.6× and 1.8×, gradual reduction of the extraction size from the YUV data is accompanied by gradual increase of the scaling factor (gradual decrease of the reduction ratio) in response to the increase of the electronic zoom magnification. The desired image size of 800×600 pixels can be provided by the extraction process and the reduction process.

When the electronic zoom magnification reaches 1.8×, the scaling factor comes to 100%. The desired image size of 800×600 pixels is provided only by the extraction process. The reduction process is not necessary at the electric zoom magnification of 1.8×.

Within the electronic zoom magnification range between 1.8× and 2.6×, gradual reduction of the extraction size from the YUV data is accompanied by gradual increase of the scaling factor (enlargement ratio) in response to the increase of the electronic zoom magnification. The desired image size of 800×600 pixels can be attained by the extraction process and the enlargement process.

When the electronic zoom magnification reaches 2.6× (boundary magnification), the reading mode of the image signal is switched from the 2×2 pixel-addition mode to the entire pixel mode. The number of pixels contained in one frame of the captured image data is set to "2,880×2,160" for storage in the internal memory 14.

Within the electronic zoom magnification range between 2.6× and 3.6×, gradual reduction of the extraction size from the YUV data is accompanied by gradual increase of the scaling factor (gradual decrease of the reduction ratio) in response to the increase of the electronic zoom magnification. The desired image size of 800×600 pixels is provided by the extraction process and the reduction process.

When the electronic zoom magnification reaches 3.6×, the scaling factor comes to 100%. The desired image size of 800×600 pixels is obtained only by the extraction process. The reduction process is not necessary at the electric zoom magnification of 3.6×.

When the setting of the electronic zoom magnification is higher than 3.6×, gradual reduction of the extraction size from the YUV data is accompanied by gradual increase of the scaling factor (enlargement ratio) in response to the increase of the electronic zoom magnification. The desired image size of 800×600 pixels can be attained by the extraction process and the enlargement process.

Further, the sharpening process or softening process is performed as the image quality adjustment in parallel with the above extraction process and reduction process.

While the electronic zoom magnification is being increased (zoom in), the contents of the image quality adjustment are changed from the sharpening process to the softening process at the boundary magnifications (1.6× and 2.6×). The sharpening process is performed in a preset lower magnification range, which is located on the lower magnification side compared to the boundary magnification. In the lower magnification range, the processing degree of the sharpening process gradually increases with the electronic zoom magnification and ends up the maximum degree at the boundary magnification. The softening process is performed in a preset higher magnification range on the higher magnification side with respect to the boundary magnification. In the higher magnification range, the processing degree of the softening process is set to the maximum at the boundary magnification. Then, the processing degree of the softening process gradually decreases with the increase of the electronic zoom magnification (refer to FIG. 8).

When the reading mode of the image signal is switched, the quality of the captured image is inevitably changed. Moreover, since the number of pixels required for the desired image size is obtained by the enlargement process in the lower magnification range, the quality of the image is lowered.

However, the boundary magnification (1.6× and 2.6×) divides the contents of the image quality adjustment in the present example. Namely, the sharpening process is performed in the lower magnification range and the softening process is performed in the higher magnification range. The processing degrees of the sharpening process and the softening process are set to the maximum at the boundary magnifications. That is, the image quality changes continuously in the preset magnification ranges located on both sides of the boundary magnification without a significant gap. Accordingly, the blurring level changes continuously at the boundary magnification as indicated by the solid line in FIG. 8.

Even when the electronic zoom magnification is changed from the higher magnification side to the lower magnification side, the electronic zoom function in which the blurring level is continuous at the boundary magnification can be realized.

Figure 12A:
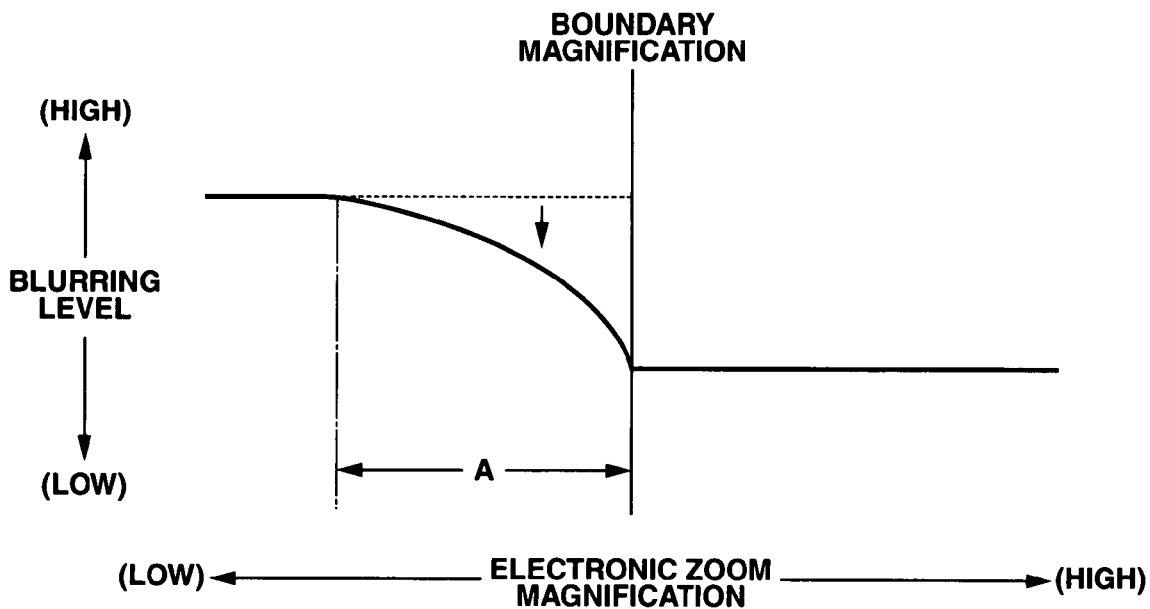
FIGS. 12A and 12B are diagrams respectively showing variations in the degree of the sharpening process (FIG. 12A) and of the softening process (FIG. 12B).

In the present embodiment, the description is given of the case in which the sharpening process is performed in the preset range on the lower magnification side with respect to the boundary magnification and the softening process is performed in the preset range on the higher magnification side with respect to the boundary magnification. However, the image quality adjustment is not limited to the above case. The image quality adjustment may be performed as follows. That is, as shown in FIG. 12A, merely the sharpening process may be performed in the range on the lower magnification side with respect to the boundary magnification. Alternatively, as shown in FIG. 12B, merely the softening process may be performed in the range on the higher magnification side with respect to the boundary magnification.

Figure 12B:
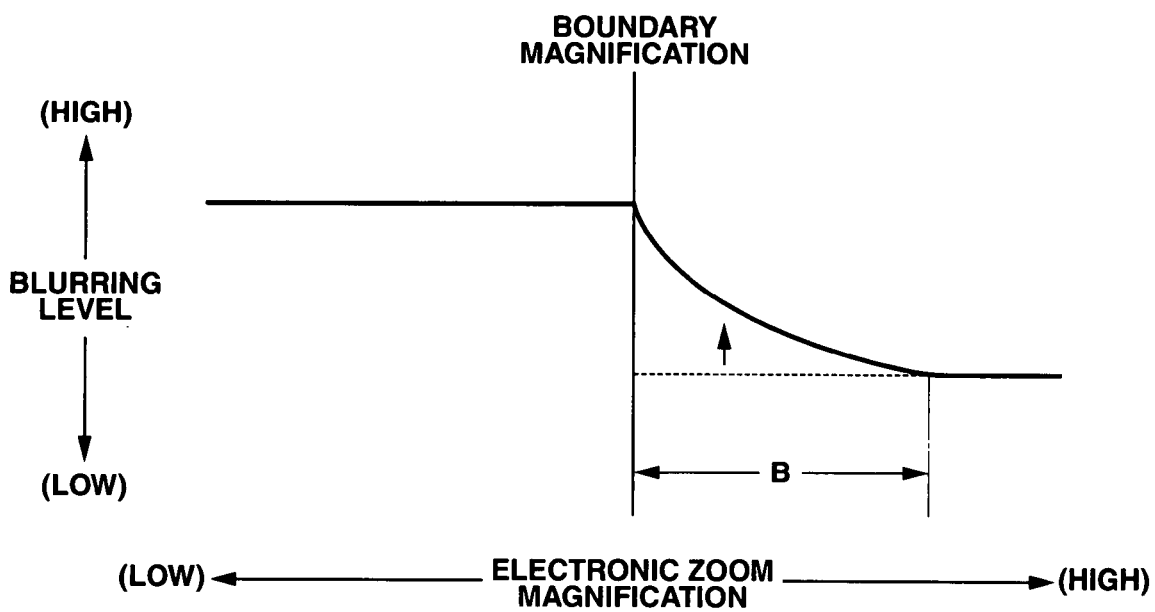

In the cases as shown in FIGS. 12A and 12B, the electronic zoom control process can be performed so that the blurring level can be continuous at the boundary magnification. Since the blurring level is continuous at the boundary magnification, the image quality adjustment can be performed without causing a significant gap in the blurring level even when the electronic zoom magnification is changed from the lower magnification side to the higher magnification side or when the electronic zoom magnification is changed from the higher magnification side to the lower magnification side. Therefore, the quality of the electronic zoom control process can be improved by eliminating a large variation in the image quality caused by the switching of the reading mode of the captured image signal. Further, a variation in the processing degree can be made abrupt in a vicinity of the boundary magnification.

In the present embodiment, the given explanation is about the case in which the processing degrees of the sharpening process and the softening process are changed in stages according to a variation in the electronic zoom magnification. However, as long as the processing degrees of the both image quality adjustment can be set to the maximum at the boundary magnification, one stage of the processing degrees may corresponds to several stages of the electronic zoom magnification. When it is configured that the electronic zoom magnification changes in a stepless fashion (or in stages which the user cannot recognize), the degree of the sharpening process or the softening process can be changed in a stepless fashion. The range in which the sharpening process or the softening process is performed is not limited to the range immediately lower or higher than the boundary magnification. The sharpening process or the softening process may be performed through an electronic zoom magnification range in which a uniform reading mode is set, except for the electronic zoom magnifications of 1× and the maximum.

Switching the reading mode of the captured image signal causes the variation in the image quality such as the variation in the blurring level. In the present embodiment, the image quality adjustment of the sharpening process and the softening process are performed in the preset magnification ranges located on both sides of the boundary magnification. The sharpening process and the softening process are performed to suppress the variation in the blurring level caused mainly by the lost of the edge part or the reduction of the contrast. However, the image quality adjustment is not limited to the above case. That is, a variation in the image quality other than the blurring level may be suppressed by performing a preset image quality adjustment other than the sharpening and softening processes in the preset ranges located on both sides of the boundary magnification. When the processing degree of the image quality adjustment is set to the maximum at the boundary magnification, the image quality can change continuously. The quality of the electronic zoom control process is improved by eliminating a large variation in the image quality caused while the electronic zoom magnification is being changed.

In the present embodiment, two types of the process corresponding to the different reading modes are performed at the same boundary magnification. However, a single process may be performed at the boundary magnification. For example, the process corresponds to the reading mode in which the number of the pixels for the pixel-addition is smaller may always be performed at the boundary magnification. Alternatively, the electronic zoom control may be performed as follows. That is, when the electronic zoom magnification reaches the boundary magnification while the zoom-up operation, the process corresponding to the reading mode in which the number of the pixels for the pixel-addition is smaller is performed, and when the electronic zoom magnification reaches the boundary magnification while the zoom-down operation, the process corresponding to the reading mode in which the number of the pixels for the pixel-addition is larger is performed.

In the present embodiment, three types of the reading mode of the captured image signal are prepared including the "entire pixel mode", "2×2 pixel-addition mode" and "3×3 pixel-addition mode" and the reading mode is set according to the electronic zoom magnification. However, it is possible to prepare four or more types of the reading mode of the captured image signal. Further, the pixel-addition is not limited to the above cases. The 5×5 pixel-addition, 2 or 3 pixel-addition in horizontal or vertical direction and the like can be performed. Further, as the reading mode of the captured image signal (drive mode of the CCD image sensor 3), one or more pixel-thinning modes may be prepared. The pixel-thinning modes vary in the pixel-thinning rate. Moreover, both the pixel-addition modes and the pixel-thinning modes may be provided as the reading mode of the image signal, and the pixel-thinning modes may be adequately set as the reading mode corresponding to the electronic zoom magnification.

In the electronic zoom control process according to the present embodiment, the setting contents of the reading mode, the extraction size, the scaling factor (enlarging ratio and reduction ratio) and the image quality adjustment corresponding to the electronic zoom magnification are detected from the setting table 100. However, the setting contents may be acquired based on a preset conditional operation or arithmetic operation.

Further, the extraction process for extracting an image area of a preset extraction size from the captured image is performed on image data (YUV data) subjected to the YUV conversion and temporarily stored in the internal memory 14. However, the extraction process may be performed on an image signal before the YUV conversion (Bayer data).

The image sensor is not limited to the CCD image sensor but may be another image sensor such as a complementary metal-oxide semiconductor (CMOS) sensor when the pixel-addition can be performed for reading out the captured image signal (either inside or outside of the image sensor). When the image sensor is configured to selectively read out a charge signal of a preset pixel as in the CMOS sensor, the above extraction process can be executed at the time of reading out the captured image signal.

The configuration in which the sharpening process and softening process are performed before the extraction process is explained above. However, the configuration may be provided such that the image quality adjustment processes are performed on image data acquired by the extraction process. Further, the configuration in which the sharpening process and the softening process are performed before the enlargement process or the reduction process is explained in the present embodiment. However, there may be provided a configuration in which the above image quality adjustment processes are performed on image data after the enlargement process or the reduction process.

In the present embodiment, a case wherein the present invention is applied to a digital camera is explained. But the present invention can be applied to another image capturing apparatus having the electronic zoom function such as a digital video camera, a mobile telephone terminal with a camera function, a personal digital assistant (PDA) with a camera function and the like. The image capturing apparatus may not be always provided with the optical zoom function.

What is claimed is:

1. An image capturing apparatus comprising:
   an image capturing element which outputs a captured image signal including pixels;
   a magnification setting unit which sets an electronic zoom magnification;
   a mode setting unit which sets one of reading modes which vary in a number of the pixels included in the captured image signal according to the electronic zoom magnification;
   an electronic zoom unit which performs an electronic zoom process on the captured image signal based on the electronic zoom magnification; and
   an image quality adjuster which performs an image quality adjustment on the captured image signal based on the electronic zoom magnification while one of the reading modes is set by the mode setting unit;
   wherein the mode setting unit includes a mode switching unit which switches the reading modes when the electronic zoom magnification reaches a preset electronic zoom magnification; and
   wherein the image quality adjuster gradually increases a processing degree of the image quality adjustment as the electronic zoom magnification comes closer to the preset electronic zoom magnification.

2. The image capturing apparatus according to claim 1, wherein the image quality adjuster gradually increases the processing degree of the image quality adjustment as the electronic zoom magnification comes closer to the preset electronic zoom magnification from an electronic zoom magnification which is smaller than the preset electronic zoom magnification.

3. The image capturing apparatus according to claim 2, wherein the image quality adjustment includes a sharpening process.

4. The image capturing apparatus according to claim 1, wherein the image quality adjuster gradually increases the processing degree of the image quality adjustment as the electronic zoom magnification comes closer to the preset electronic zoom magnification from an electronic zoom magnification which is larger than the preset electronic zoom magnification.

5. The image capturing apparatus according to claim 4, wherein the image quality adjustment includes a softening process.

6. The image capturing apparatus according to claim 1, wherein the image quality adjuster includes:
- a first image quality adjuster which gradually increases a processing degree of a first image quality adjustment as the electronic zoom magnification comes closer to the preset electronic zoom magnification from an electronic zoom magnification which is smaller than the preset electronic zoom magnification; and
- a second image quality adjuster which gradually increases a processing degree of a second image quality adjustment as the electronic zoom magnification comes closer to the preset electronic zoom magnification from an electronic zoom magnification which is larger than the preset electronic zoom magnification.

7. The image capturing apparatus according to claim 6, wherein the first image quality adjustment comprises a sharpening process and the second image quality adjustment comprises a softening process.

8. The image capturing apparatus according to claim 1, further comprising a controller which controls whether the image quality adjuster performs the image quality adjustment based on the electronic zoom magnification.

9. The image capturing apparatus according to claim 1, wherein the image quality adjustment includes a sharpening process.

10. The image capturing apparatus according to claim 1, wherein the image quality adjustment includes a softening process.

11. The image capturing apparatus according to claim 1, wherein the electronic zoom unit includes a trimming unit which performs a trimming process on the captured image signal based on the electronic zoom magnification.

12. The image capturing apparatus according to claim 1, wherein the electronic zoom unit includes a reduction unit which performs a reduction process on the captured image signal based on the electronic zoom magnification.

13. The image capturing apparatus according to claim 1, wherein the electronic zoom unit includes an enlargement unit which performs an enlargement process on the captured image signal based on the electronic zoom magnification.

14. The image capturing apparatus according to claim 1, wherein the electronic zoom unit includes a scaling unit which performs a reduction process and an enlargement process on the captured image signal based on the electronic zoom magnification.

15. The image capturing apparatus according to claim 1, wherein the reading modes include a pixel-addition reading mode.

16. The image capturing apparatus according to claim 1, wherein the reading modes include pixel-addition reading modes which vary in number of the pixels utilized for pixel addition, and the mode setting unit sets one of the reading modes so that the number of the pixels utilized for the pixel addition is set smaller as the electronic zoom magnification is set larger by the magnification setting unit.

17. The image capturing apparatus according to claim 1, wherein the reading modes include a pixel thinning mode.

18. An electronic zoom method which is used for an image capturing apparatus comprising an image capturing element which outputs a captured image signal including pixels, the method comprising:
- setting an electronic zoom magnification;
- setting one of reading modes which vary in a number of the pixels included in the captured image signal according to the electronic zoom magnification;
- performing an electronic zoom process on the captured image signal based on the electronic zoom magnification; and
- performing an image quality adjustment on the captured image signal based on the electronic zoom magnification while one of the reading modes is set;
- wherein setting one of the reading modes includes switching the reading modes when the electronic zoom magnification reaches a preset electronic zoom magnification; and
- wherein performing the image quality adjustment comprises gradually increasing a processing degree of the image quality adjustment as the electronic zoom magnification comes closer to the preset electronic zoom magnification.

19. A computer-readable storage medium having a program stored thereon which controls an image capturing apparatus including an image capturing element which outputs a captured image signal including pixels to perform functions comprising:
- setting an electronic zoom magnification;
- setting one of reading modes which vary in a number of the pixels included in the captured image signal according to the electronic zoom magnification;
- performing an electronic zoom process on the captured image signal based on the electronic zoom magnification; and
- performing an image quality adjustment on the captured image signal based on the electronic zoom magnification while one of the reading modes is set;
- wherein setting one of the reading modes includes switching the reading modes when the electronic zoom magnification reaches a preset electronic zoom magnification; and
- wherein performing the image quality adjustment comprises gradually increasing a processing degree of the image quality adjustment as the electronic zoom magnification comes closer to the preset electronic zoom magnification.

* * * * *